(12) United States Patent
Kwon

(10) Patent No.: US 10,990,832 B2
(45) Date of Patent: Apr. 27, 2021

(54) LANE LINE RECONSTRUCTION USING FUTURE SCENES AND TRAJECTORY

(71) Applicant: Phantom AI, Inc., Burlingame, CA (US)

(72) Inventor: Youngwook Paul Kwon, Burlingame, CA (US)

(73) Assignee: Phantom AI, Inc., Burlingame, CA (US)

(*) Notice: Subject to any disclaimer, the term of this patent is extended or adjusted under 35 U.S.C. 154(b) by 128 days.

(21) Appl. No.: 16/294,355

(22) Filed: Mar. 6, 2019

(65) Prior Publication Data

US 2019/0279004 A1 Sep. 12, 2019

Related U.S. Application Data

(60) Provisional application No. 62/639,260, filed on Mar. 6, 2018.

(51) Int. Cl.
*G06K 9/00* (2006.01)
*G08G 1/16* (2006.01)
*G06T 7/70* (2017.01)
*G06N 5/04* (2006.01)
*G05D 1/02* (2020.01)
*G06K 9/62* (2006.01)
*G05D 1/00* (2006.01)

(52) U.S. Cl.
CPC ....... *G06K 9/00798* (2013.01); *G05D 1/0088* (2013.01); *G05D 1/0246* (2013.01); *G06K 9/6256* (2013.01); *G06N 5/046* (2013.01); *G06T 7/70* (2017.01); *G08G 1/167* (2013.01); *G05D 2201/0213* (2013.01); *G06T 2207/30256* (2013.01)

(58) Field of Classification Search
None
See application file for complete search history.

(56) References Cited

U.S. PATENT DOCUMENTS 9,063,548 B1 6/2015 Ferguson et al.
2017/0039436 A1 2/2017 Chen et al.
2019/0025853 A1* 1/2019 Julian ...................... G06T 7/74

OTHER PUBLICATIONS

PCT International Search Report and Written Opinion, PCT Application No. PCT/US19/20964, dated May 28, 2019, 11 pages.

* cited by examiner

*Primary Examiner* — Leon Flores
(74) *Attorney, Agent, or Firm* — Fenwick & West LLP

(57) ABSTRACT

A vehicle capable of autonomous driving includes a lane detection system. The lane detection system is trained to predict lane lines using training images. The training images are automatically processed by a training module of the lane detection system in order to create ground truth data. The ground truth data is used to train the lane detection system to predict lane lines that are occluded in real-time images of roadways. The lane detection system predicts lane lines of a roadway in a real-time image even though the lane lines maybe indiscernible due to objects on the roadway or due to the position of the lane lines being in the horizon.

20 Claims, 11 Drawing Sheets

LANE LINE RECONSTRUCTION USING FUTURE SCENES AND TRAJECTORY

CROSS-REFERENCE TO RELATED APPLICATIONS

This application claims priority to U.S. Provisional Patent Application No. 62/639,260 filed on Mar. 6, 2018, which is incorporated by reference in its entirety.

BACKGROUND

1. Field of Art

The present disclosure generally relates to autonomous control systems for vehicles, and more specifically to a lane line detection system for reconstructing lane lines of roadways.

2. Background of the Invention

Autonomous control systems guide vehicles (e.g., automobiles, trucks, vans) with minimal to no guidance by human operators. Autonomous control systems analyze the surrounding physical environment and determine lanes of roadways from the physical environment. Based on the determined lanes, the autonomous control systems can navigate the vehicles within the determined lanes.

However, conventional autonomous control systems cannot account for objects within the physical environment that occlude lane lines designating the lanes of the roadways as well as anticipate the curvature of the lanes that are near the vanishing points of the physical environment within sight of the vehicle at a particular location.

SUMMARY

A vehicle with autonomous or semi-autonomous driving capabilities is disclosed. The vehicle includes a camera system that captures real-time images of roadways being traveled on by the vehicle. Oftentimes, lane lines that designate lanes of a roadway are occluded by objects such as other vehicles or road debris. Furthermore, lane lines in the horizon are difficult to determine due to the distance of the lane lines from the vehicle.

The vehicle includes a lane detection system that predicts lane lines of a roadway in a real-time image captured by the camera system even though the lane lines maybe partly indiscernible due to objects on the roadway or due to the position of the lane lines being in the horizon. The lane detection system is trained to predict lane lines using training images. In one embodiment, the training images are automatically processed by a training module of the lane detection system in order to create ground truth data. The ground truth data is used to train the lane detection system to predict lane lines in real-time images of roadways captured by the camera system The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
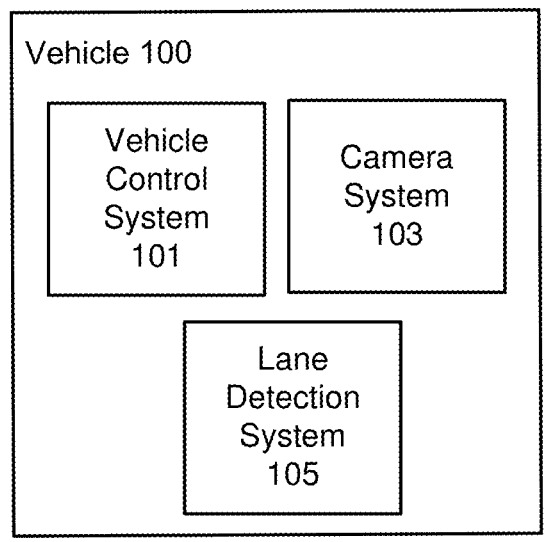
FIG. 1 is a representation of a vehicle that includes a lane detection system according to one embodiment.

FIG. 1 is a representation of a vehicle 100 according to one embodiment. An automobile is one example of the vehicle 100. As shown in FIG. 1, the vehicle 100 includes a vehicle control system 101. In one embodiment, the vehicle control system 101 is representative of the electrical and/or mechanical systems of the vehicle 100 that allow control of the movement of the vehicle. For example, the vehicle control system 101 includes the powertrain of the vehicle 100. Generally, the powertrain of the vehicle 100 describes the components of the vehicle 100 that generate power and deliver the power to the road surface. The power train may include an internal combustion engine, one or more electric motors, or a combination of an internal combustion engine and electric motor(s) (e.g., a hybrid engine).

The vehicle control system 101 may also comprise the brake system (e.g., brake calipers, brake rotors, ABS sensors, ABS controller, etc.) of the vehicle 100 used to slow/stop the vehicle 100 as well as the steering system (e.g., steering wheel, steering rack, rack and pinion, etc.) of the vehicle 100 used to change the direction of travel of the vehicle 100. Lastly, the vehicle control system 101 may also include various sensors to detect the proximity of other vehicles near the vehicle 100 for autonomous driving of the vehicle 100. The vehicle control system 101 can include any other sub-systems of a vehicle than those described herein.

The vehicle 100 also includes a camera system 103 that comprises at least one camera. The camera system 103 captures images in real-time while the vehicle 100 is operated on roadways. Generally, a roadway includes one or more lanes. Each lane of a roadway is designated for use by a single line of one or more vehicles and is used to guide the vehicles travelling along the roadway. Each lane is typically designated by a set of lane lines. Lane lines are road surface markings that visually indicate to operators of vehicles of the location of a corresponding lane in the roadway. Examples of the road surface markings including solid lines, dashed lines, or Botts' dots. As the vehicle is travelling down a roadway, the camera system 103 captures images of the roadway from the point of view of the vehicle 100.

In one embodiment, the camera system 103 captures images at a threshold frequency such as at 30 Hz. Thus, for a single hour of recording, the camera system 103 generates 108,000 images. In other embodiments, the camera system 103 may capture images at frequencies other than 30 Hz.

In one embodiment, the camera system 103 is mounted to the vehicle 100. The camera system 103 may be mounted on the dashboard of the vehicle 100 or the roof of the vehicle 100. However, the camera system 103 may be mounted in other locations such as on the front bumper of the vehicle 100 or any other location on the vehicle. The camera system 101 may be mounted in a fixed orientation or may be mounted in an adjustable orientation.

The vehicle 100 also includes a lane detection system 105. In one embodiment, the lane detection system detects lanes of roadways. By detecting the lanes of roadways, the lane detection system 105 can communicate with the vehicle control system 101 for the vehicle 100 to navigate within a lane(s) of a roadway with little to no intervention from a human operator that is within the vehicle 100. That is, the lane detection system 105 allows for autonomous driving of the vehicle 100. The lane detection system 105 may also be used for semi-autonomous driving such as for a function that assists in maintaining the vehicle 100 within a given lane of a roadway (e.g., a lane-keeping assistant mode of the vehicle 100).

Lane Detection Training

Figure 2:
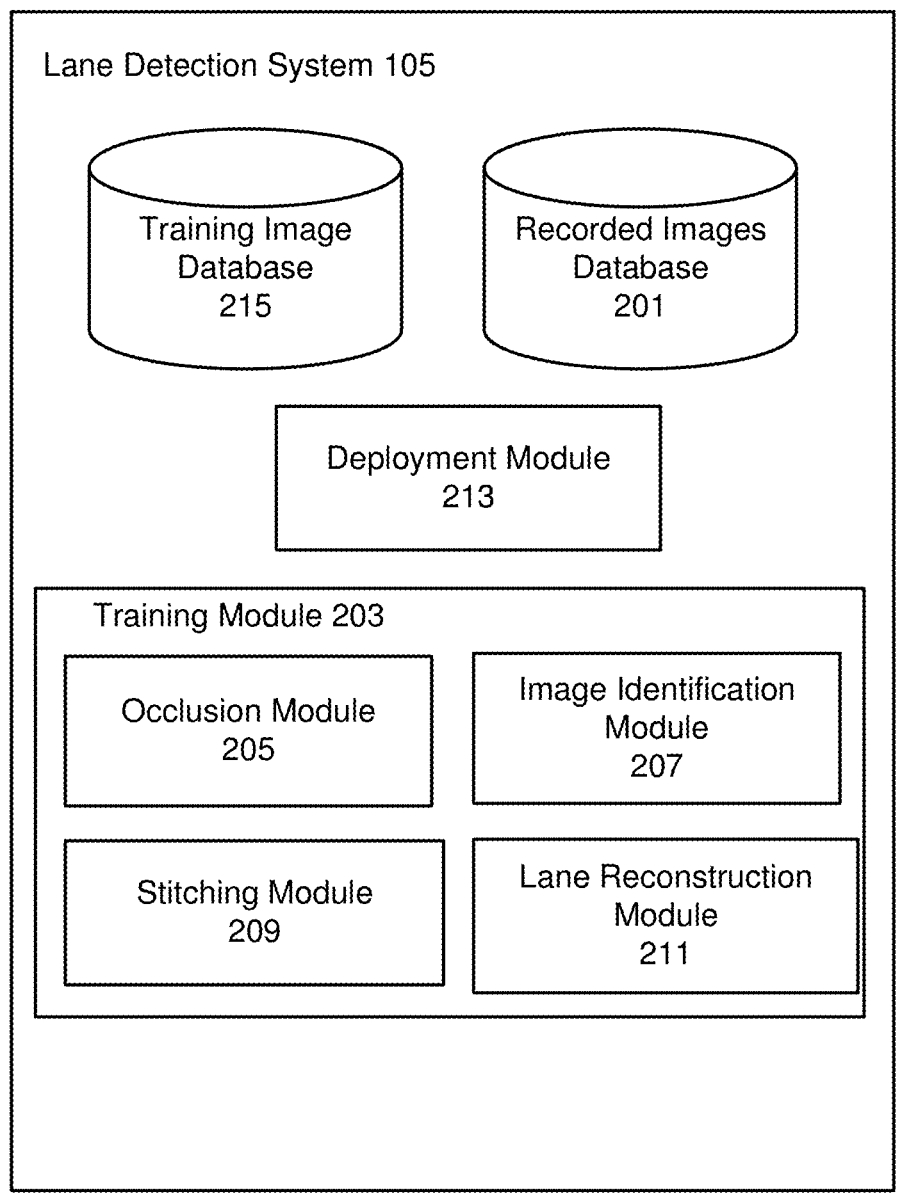
FIG. 2 is a detailed view of the lane detection system of the vehicle according to one embodiment.

FIG. 2 is a detailed view of the lane detection system 105. In one embodiment the lane detection system 105 includes a training module 203. The training module 203 trains a deployment module 213 to predict lane lines within a given real-time image of a roadway that are occluded by objects such as other vehicles or road debris or predict lane lines in the horizon.

The training module 203 trains the deployment module 213 based on training images stored in a training image database 215. In one embodiment, the training image database 215 stores training images captured over a threshold period of time (e.g., 3 months). In one embodiment, the training images are a collection of images representative of different roadways. The training images include a plurality of training image sets where each training image set includes at least an image I(t) of a roadway with occluded lane lines at a time t, at least one image I(t+α) of the same roadway at some later time (e.g., t+α), and an image G(t) of the same roadway with the reconstructed lane lines of the roadway at time t. Thus, the training images comprise of at least an image pair comprising I(t) and G(t). At least a portion of the training images (e.g., the training image of a roadway at time t with occluded lane lines and at least one training image of the roadway at a later instance in time) are loaded into the training image database 215 by a developer of the lane detection system 105.

Figure 3:
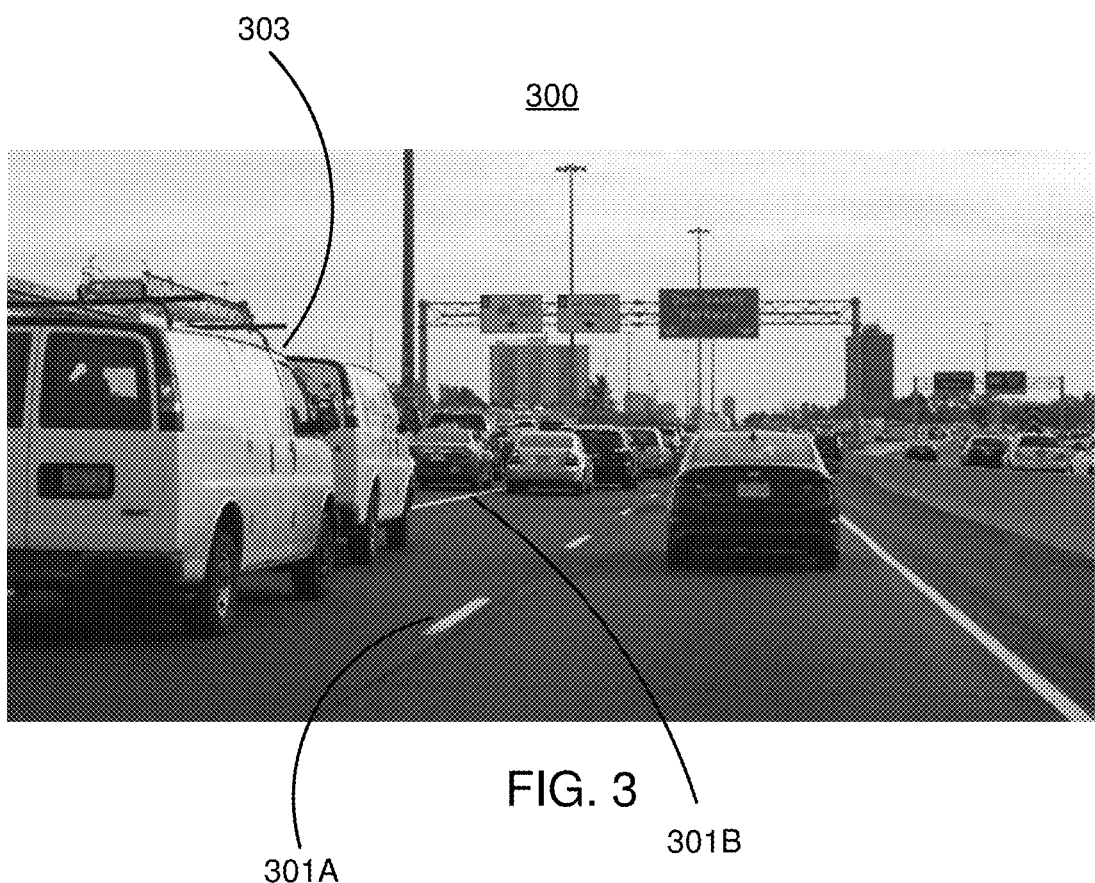
FIG. 3 is an example training image.

FIG. 3 is an example of a training image 300 that is stored in the training image database 215. As shown in the training image 300, the roadway includes a lane designated by lane lines 301A and 301B. A portion of the lane line 301B is occluded by vehicles 303. Furthermore, the lane lines 301 are not visible at the horizon of the image 300. Due to the occlusions in the roadway and the lane lines being difficult to identify in the horizon, the training image 300 is not currently usable to train the deployment module 213. Thus, for any training image that has lane lines occluded by objects in the roadway or lane lines that are difficult to determine due to the lane lines being in the horizon of the training image, the training module 203 reconstructs the lane lines. By automatically generating the training images with non-occluded lane lanes, the training module 203 enables unsupervised learning as human labelers are not needed to designate the occluded lane lines in the training images.

Referring back to FIG. 2, in one embodiment, the training module 203 includes an occlusion module 205 that determines whether lane lines of training images are occluded. As mentioned above, training images with occluded lane lines cannot be used to train the deployment module 213. The lane lines of the training images must be reconstructed by the training module 203 so that the training images can be used to train the deployment module 213.

The occlusion module 205 receives a training image(s) from the training image database 215 while the vehicle 100 is not being operated on roadways. That is, while the vehicle 100 is turned off, the occlusion module 205 processes training images in the training image database 215 to determine training images with lane lines that are occluded or lane lines that are difficult to identify due to the lane lines being positioned within the horizon of the training image. Responsive to a training image being received, the occlusion module 205 determines whether lane lines in the training image are occluded by one or more objects in the roadway. The occlusion module 205 may perform image analysis techniques on a training image to determine whether lane lines are occluded. The image analysis techniques include edge detection, color extraction, and/or deep-learning based segmentation. However, other image analysis techniques may be used to detect the lane lines in the image. If the occlusion module 205 determines that the lane lines in the training image are occluded, the occlusion module 205 provides the training image to an image identification module 207 for further processing. In one embodiment, the occlusion module 205 also provides training images with non-occluded lane lines to the image identification module 207 due to the lane lines near the vanishing point of the training images being ambiguous.

For a training image of a roadway at a given time, the image identification module 207 identifies one or more images that are representative of the position of the vehicle on the roadway at later times. That is, for a given training image, the image identification module 207 identifies one or more images of the same roadway at some later time (e.g., t+α) from the training image set to which the training image belongs.

The training module 203 further includes a stitching module 209. The stitching module 209 stitches (e.g., combines) the training image and the images identified by the image identification module 207 into a stitched image (e.g., a combined image) from which the lane lines of the roadway in the training image can be reconstructed. For each of the training image and its corresponding identified images, the stitching module 209 determines an aerial view image (i.e., a bird's eye view, an inverse projective mapping (IPM) image, etc.). An aerial view of an image is a representation of the content of the image (e.g., the roadway) at a great height.

Figure 4A:
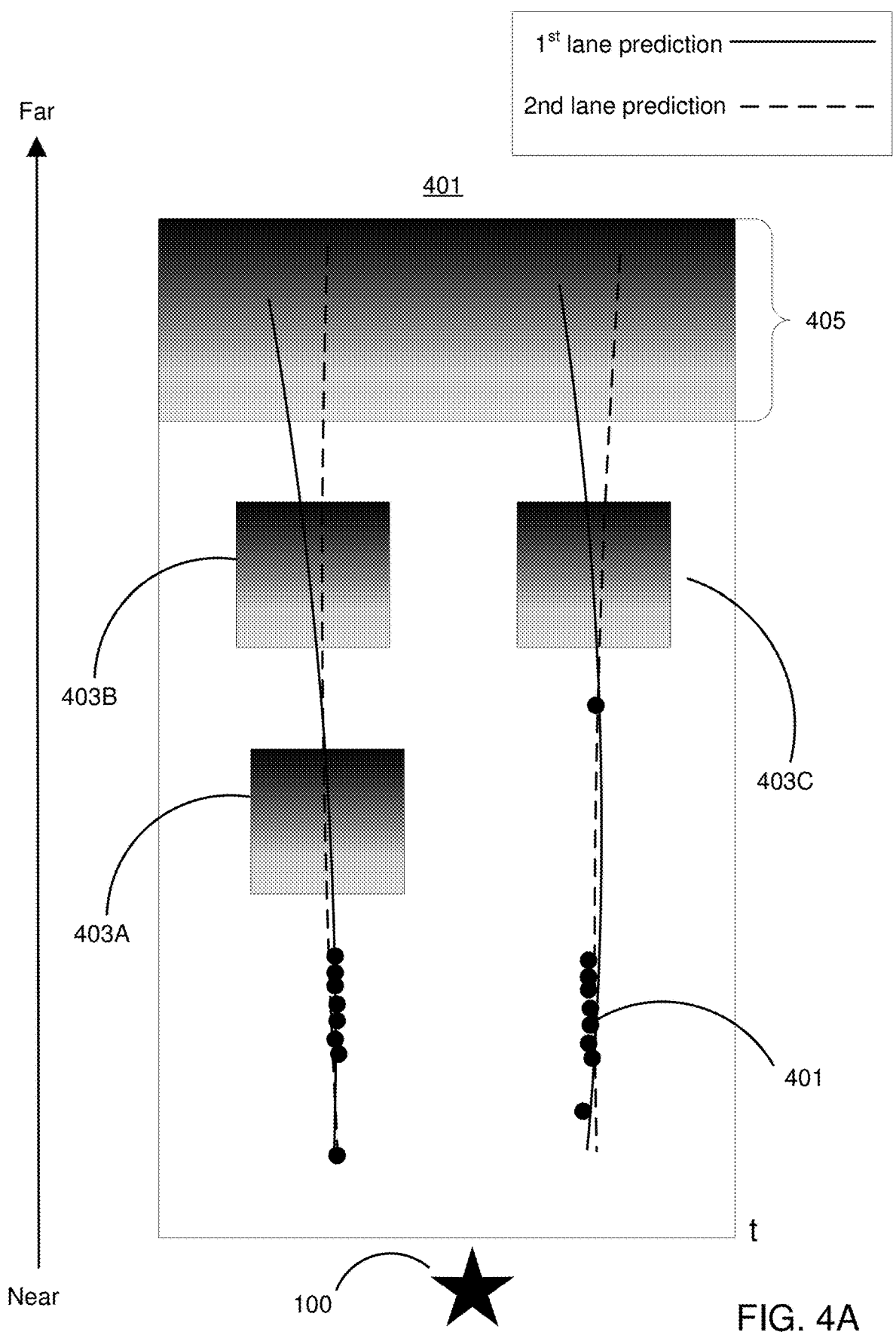
FIGS. 4A-4C are aerial view images that represent a roadway according to one embodiment.

FIG. 4A is an aerial view image 401 corresponding to the training image 300 at time t. The aerial view image 401 illustrates the position of the vehicle 100 at time t and a plurality of identifiers 401 (e.g., circles) indicative of the lane lines detected within the training image. The aerial view image 401 also depicts objects 403A, 403B, and 403C (e.g., other vehicles) that occlude the lane lines within the training image.

As shown in FIG. 4A, the lane lines closest to the vehicle 100 are discernable due to the closeness of the lane lines to the vehicle 100. However, the portions of the lane lines that are occluded by the objects 401 and the portions of the lane lines that are in the horizon 405 are indiscernible to the training module 203. As a result, the training module 203 is unable to determine the position of the lane lines within the roadway from just the training image alone. As shown in FIG. 4A, there is a possibility of two possible lane line positions in the training image due to the objects 401 and the lane lines being located in the horizon 405. The possible positions of the lane lines include a first possible lane position represented by the solid lines in FIG. 4A and a second possible lane position represented by the dashed lines in FIG. 4A.

Figure 4B:
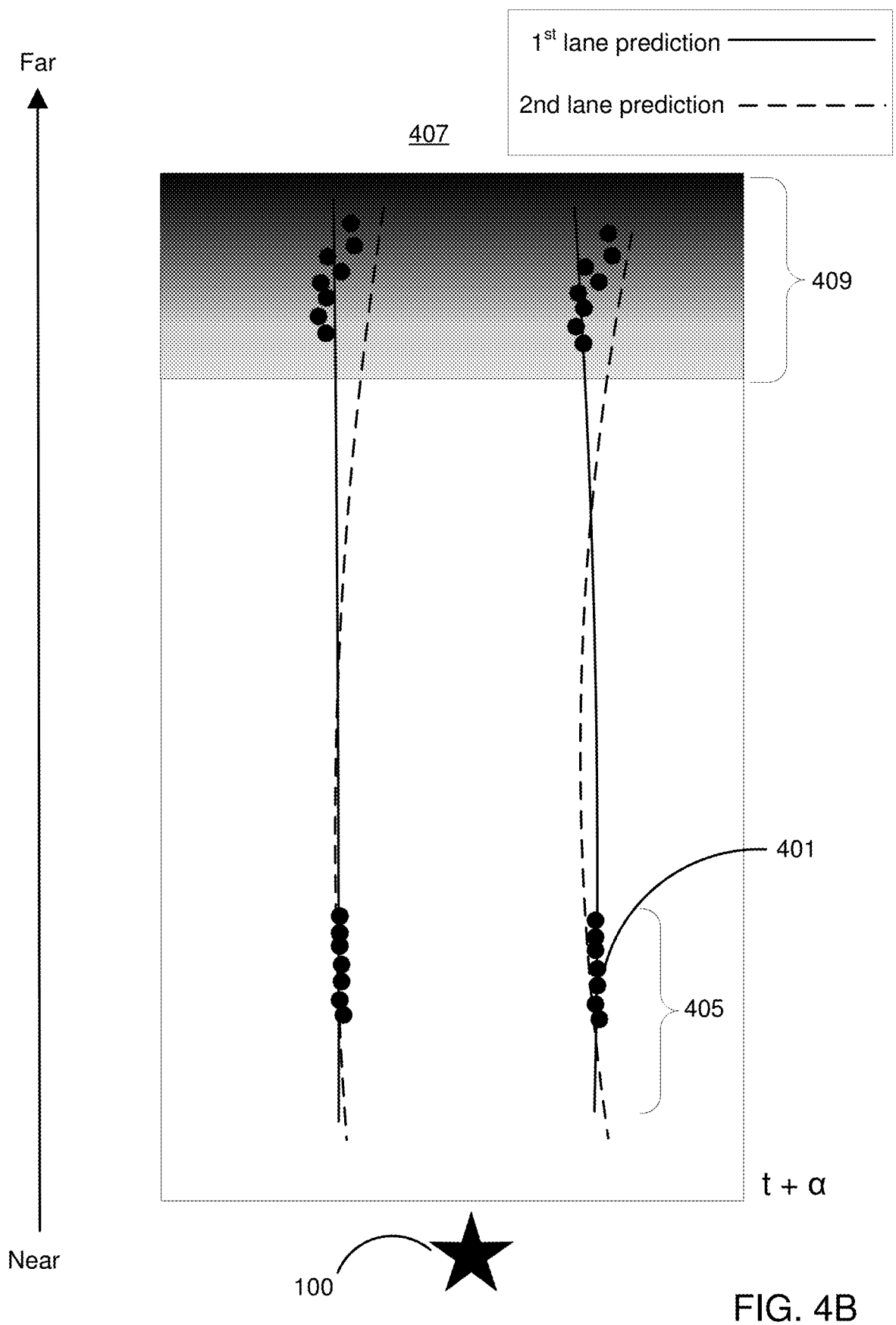

FIG. 4B is an aerial view 407 of a first image identified by the image identification module 207. The aerial view 407 is a representation of the roadway at a time t+a that is later than time t. As mentioned above, for a given training image at time t shown in FIG. 4A, the training module 203 relies upon images captured in the past to be representative of the roadway at later times (i.e., the future). Thus, the past images function as future images for a training image at a given time t.

As described previously, the lane lines near the horizon 405 at time t in FIG. 4A are indiscernible to the training module 203 due to distance of the lane lines in the horizon 405 to the vehicle 100. However, as shown in FIG. 4B, the line lines represented by indicators 401 in FIG. 4B that were once in the horizon 405 shown in FIG. 4A are now near the vehicle 100 at time t+a in FIG. 4B. Thus, the lane lines represented by indicators 401 that were once indiscernible to the training module 203 at time t are now more discernable to the training module 203 at time t+a in FIG. 4B. However, similar to FIG. 4A, the aerial view 407 at time t+a still has two possible lane line positions due to the lane lines in the horizon 409 at time t+a being indiscernible to the training module 203.

Figure 4C:
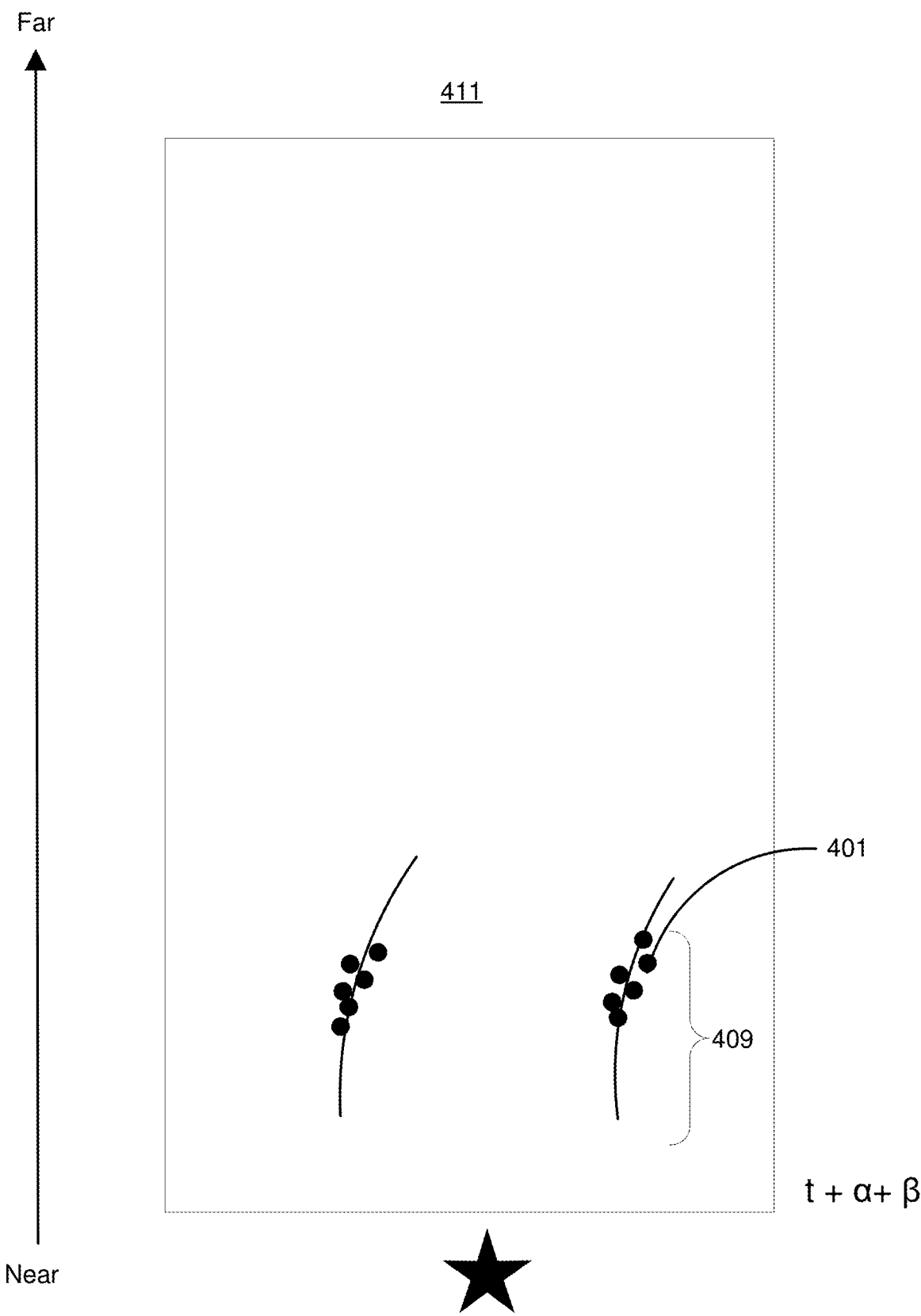

FIG. 4C is an aerial view 411 of a second image identified by the image identification module 207. The aerial view 411 is a representation of the roadway at a time t+α+β that is later than time t+α. As described previously, the lane lines near the horizon 409 at time t+α in FIG. 4B are indiscernible to the training module 203 due to distance of the lane lines in the horizon 409 to the vehicle 100. However, as shown in FIG. 4C, the line lines represented by indicators 401 in FIG. 4C that were once in the horizon 409 at time t+α shown in FIG. 4B are now near the vehicle 100 at time t+α+β in FIG. 4C. Thus, the lane lines represented by indicators 401 that were once indiscernible to the training module 203 at time t+α are now more discernable at time t+α+ft.

The stitching module 209 combines the aerial views of the training image and the images identified by the image identification module 207 into a stitched image. In one embodiment, the stitched image includes the lane markers and objects from the aerial views of the training image and the identified images as described with respect to FIGS. 4A-4C. As will be further described below, the lane lines of the roadway are reconstructed based on the stitched image.

The stitching module 209 may combine aerial views using any algorithm that can match together pixels from different images. For example, the stitching module 209 may use a scale-invariant feature transform (SIFT) algorithm or a Bundle algorithm to combine the aerial views of the training image and the images predicted by the image identification module 207 into the stitched image.

Figure 5A:
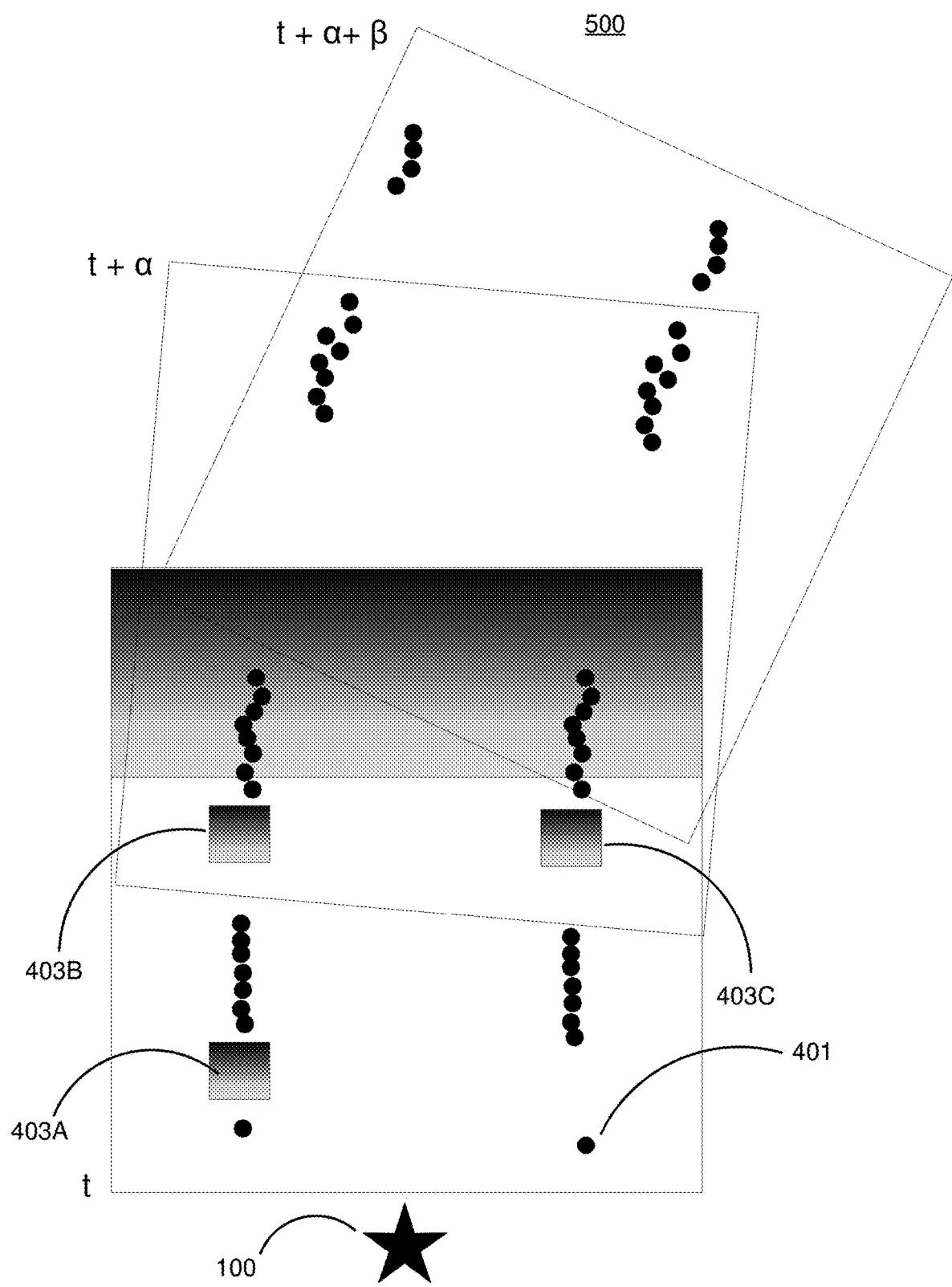
FIGS. 5A-5B are stitched aerial view images according to one embodiment.

FIG. 5A is an example of a stitched image 500 generated by the stitching module 209 using the aerial view images 401, 407, and 411 shown in FIGS. 4A-4C. As shown in FIG. 5A, each aerial view image is angled with respect to each other. The degree of angle of each aerial view image is based on the trajectory of the vehicle 100 and orientation of the camera system 103.

Referring back to FIG. 2, the deployment module 203 also includes a lane reconstruction module 211. The lane reconstruction module 211 reconstructs lane lines of roadways in training images. In one embodiment, the lane reconstruction module 211 reconstructs lane lines of a roadway using a stitched image generated by the stitching module 209 as described above. The lane reconstruction module 211 analyzes the stitched image to determine objects in the roadway as well as the discernable lane lines within the stitched image.

For example, referring to FIG. 5A, the lane reconstruction module 211 determines from the stitched image 500 objects 403 and the discernable lane lines represented by identifiers 401. From the determined objects and the discernable lane lines, the lane reconstruction module 211 can reconstruct the position of the lane lines of the roadway using a curve fitting algorithm.

Figure 5B:
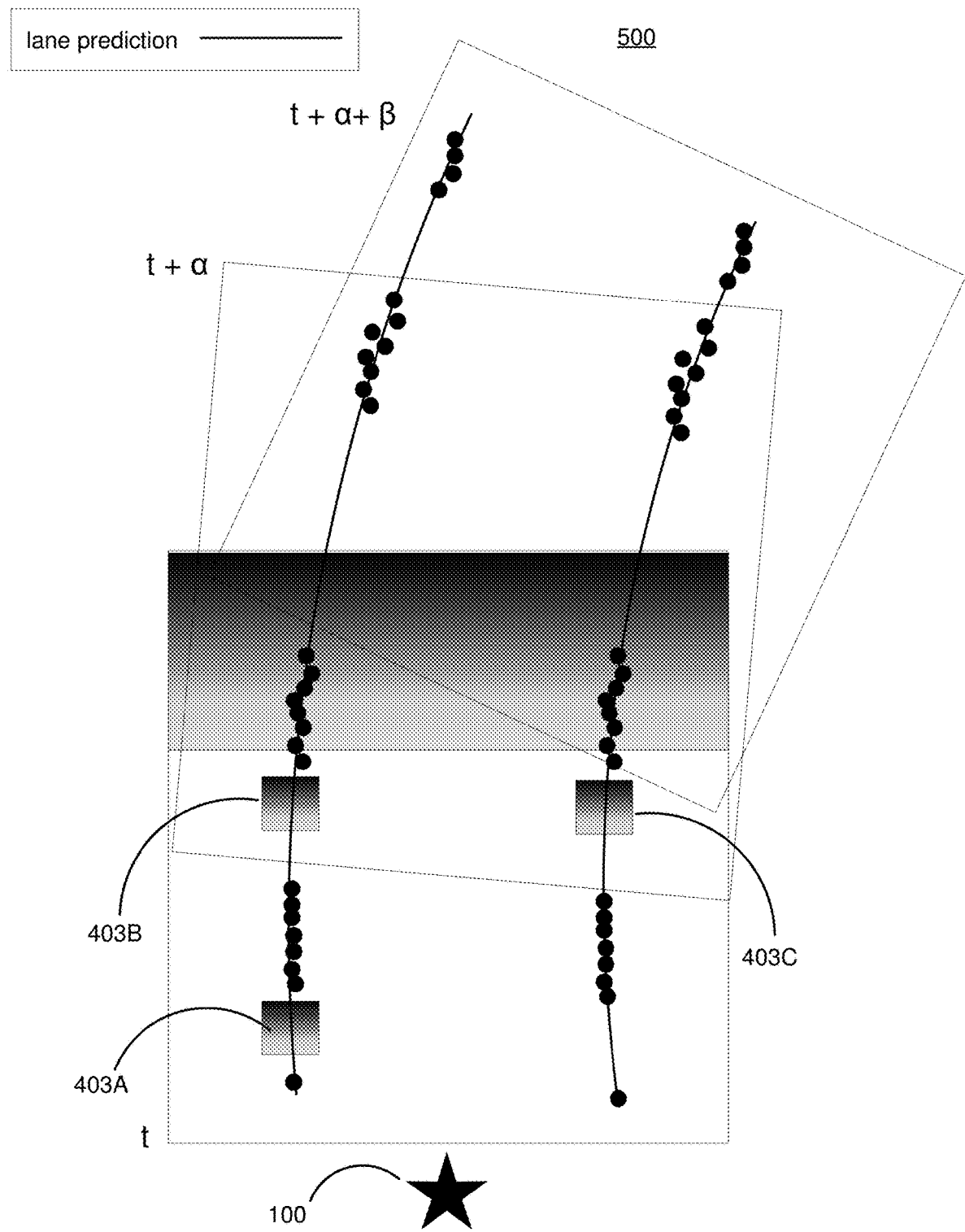

FIG. 5B is an aerial view 500 of the stitched image with the lane reconstruction made by the lane reconstruction module 211. As shown in FIG. 5B, the stitched image includes solid lines representing the predicted lane lines in the roadway. Thus, the lane reconstruction module 211 is able to reconstruct the lane lines from the training image that were initially indiscernible due to being occluded by objects in the roadway or due to the lane lines being in the horizon.

In one embodiment, once the training module 203 has generated the ground truth data for training the deployment module 213 by reconstructing lane lines in the training images, the training module 213 extracts features of the training images with the reconstructed lane lines. The features extracted by the training module 213 from the training images serve as descriptive, quantitative representations of the training images for use in training the deployment module 213. In one embodiment, the following features are extracted:

A histogram of local features sampled at sparse interest points using a Laplacian-of-Gaussian (LoG) or Scale Invariant Feature Transform (SIFT) feature extractor, with local descriptors being computed using Gabor wavelet responses at different orientations, spatial scales, and spatial offsets;

A color histogram computed using hue and saturation in HSV (hue-saturation-value) color space;

Color motion defined as the cosine distance of color histograms between two consecutive frames;

Edge features using edges detected by a Canny edge detector in regions of interest;

Line features using lines detected by a probabilistic Hough Transform; and/or

Shot boundary detection based features using differences of color histograms from consecutive frames.

The combination of the various features extracted from training images serves as feature vectors that characterize the training images.

The deployment module 213 is a machine-learned neural network model. To train the deployment module 213, the training module 203 applies the feature vectors that characterize the training images with the reconstructed lane lines to the deployment module 213 as an input to the deployment module 213. The training module 203 trains the deployment module 213 to learn a set of weights on features of the training images with the reconstructed lane lines so that the deployment module 213 can predict lane lines in a given real-time image of a roadway at time t.

Once the initial training of the deployment module 213 is complete, the training module 203 re-applies the training images to the trained deployment module 213 (e.g., to the machine-learned neural network model) to test the accuracy of the trained deployment module 213. Responsive to receiving a training image of the position of a vehicle in a roadway at time t, the deployment module 213 outputs a prediction of lane lines in the roadway. Given that each training image is part of a training image set with the reconstructed lane lines, the training module 203 can compare the lane lines predicted by the deployment module 213 to the lane lines reconstructed by the training module 203. The training module 203 determines whether the deployment module 213 accurately predicted the lane lines in the training image based on the comparison.

The training module 203 may update the deployment module 213 (e.g., the machine-learned neural network model) if the training module 203 determines that the deployment module 213 did not accurately predict the lane lines in the training images. The training module 203 may update the deployment module 213 by adjusting the weights of the features of the training images in the machine-learned neural network model. The training module 203 may iteratively update the deployment module 213 until the deployment module 213 can predict lane lines in the training images with a threshold accuracy (e.g., 90% accuracy). Once the training module 203 has trained the deployment module 213 to have the threshold accuracy, the deployment module 213 is considered trained.

In one embodiment, the training module 203 will retrain the deployment module 213 (e.g., the machine-learned neural network model) using real-time images stored in a recorded images database 201. By using the real-time images stored in the recording images database 201 to retrain the deployment module 213, the training module 203 can improve the prediction capabilities of the deployment module 213. In one embodiment, the training module 203 retrains the deployment module 213 after a threshold amount of time has elapsed since the last training. For example, the training module 203 retrains the deployment module 213 every 30 days. Alternatively, the training module 203 retrains the deployment module 213 after a threshold amount of new images are stored in the recoded images database 201 (e.g., 1 million images).

Figure 6:
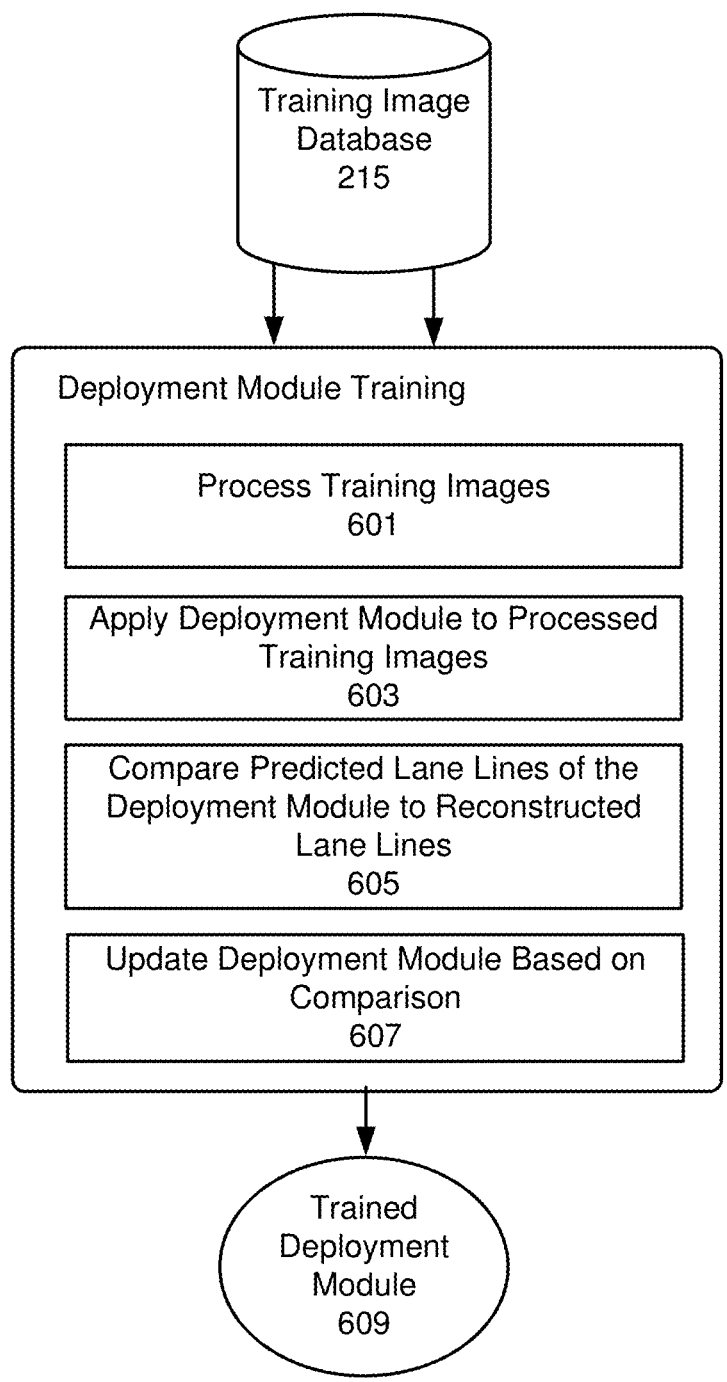
FIG. 6 is a method flow diagram describing training of the lane detection system, according to one embodiment.

Referring to FIG. 6, one embodiment of a method flow diagram for training the deployment module 213 is shown. Note that in other embodiments, other steps than those shown in FIG. 7 can be used for image identification training.

In one embodiment, the training module 203 uses the training images stored in the training image database 215 for training of the deployment module 213. The training module 203 processes 601 the training images in the training image database 215. The training module 203 processes the training images by reconstructing lane lines in the training images that are occluded by objects in the roadways depicted in the training images or by reconstructing lane lines that are in the horizon of the training images. The training module 203 processes the training images to be useable for training the deployment module 213.

The training module 203 applies 603 the processed training images with the reconstructed lane lines—that is the feature vectors of the processed training images—to the deployment module 213 (e.g., a machine-learned neural network model). The deployment module 213 predicts lane lines for each training image of a roadway at time t. For each training image, the training module 203 compares 605 the predicted lane lines of each training image from the deployment module 213 to the reconstructed lane lines from the training module 203 to determine whether the deployment module 213 accurately predicted the lane lines in each training image. The training module 203 updates 607 the deployment module 213 based on the comparison. That is, the training module 203 updates the weights of the deployment module 213 based on an accuracy of the predictions of lane lines made by the deployment module 213. The training module 203 may recursively train the deployment module 213 until the deployment module 213 can predict lane lines for each of the training images with a threshold accuracy.

Real-Time Deployment

Returning back to FIG. 2, the lane detection system 105 includes a recorded image database 201. The recorded image database 201 stores real-time images captured by the camera system 103 as the vehicle 100 is travelling along roadways. As described above, often times lane lines of a roadway are occluded by objects such as other vehicles or road debris. Furthermore, lane lines in the horizon of the physical environment of the vehicle 100 are difficult to determine due to the distance of the lane lines from the vehicle 100.

As described above, the lane detection system 105 includes the deployment module 213. The deployment module 213 predicts lane lines within a roadway in real-time once trained by the training module 203. For example, the deployment module 213 can predict the lane lines 301A and 301B that are occluded by vehicles in FIG. 3 and predict the position of the lane lines that are in the horizon as the vehicle 100 is being driven on the roadway if the image shown in FIG. 3 were a real-time image captured by the camera system 103. The deployment module 213 can communicate with the vehicle control system 101 of the vehicle 100 to autonomously or semi-autonomously navigate within the lanes of the roadway based on the predicted lane lines.

Figure 7:
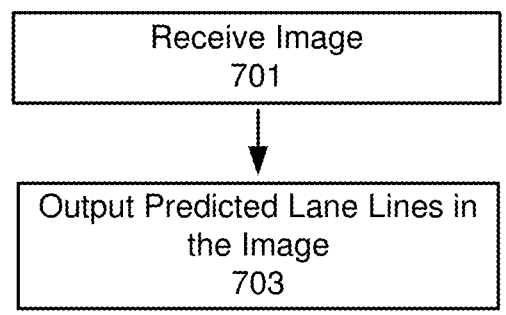
FIG. 7 is a method flow diagram describing deployment of the lane detection system in the vehicle according to one embodiment.

FIG. 7 is one embodiment of a method flow diagram of deploying the lane detection system 105 as the vehicle 100 is operating on roadways. Note that in other embodiments, steps other than those shown in FIG. 6 may be used to deploy the lane detection system 105.

In one embodiment, the lane detection system 105 receives 701 an image. The image is a real-time image of the roadway that the vehicle 100 is travelling on and is captured by the camera system 103 of the vehicle 100. The real-time image may depict lane lines of one or more lanes of the roadway. The lane lines may be occluded due to objects on the roadway (e.g., other vehicles). The lane lines in the horizon of the image may also be indiscernible to the lane detection system 105 due to the distance of the horizon from the vehicle 100.

The lane detection system 105 outputs 603 a prediction of the lane lines of the roadway that are occluded in the image and/or a prediction of the lane lines that are in the horizon of the image. The predicted lane lines are communicated to the vehicle control system 101 for autonomous or semi-autonomous control of the vehicle 100.

Hardware Components

Figure 8:
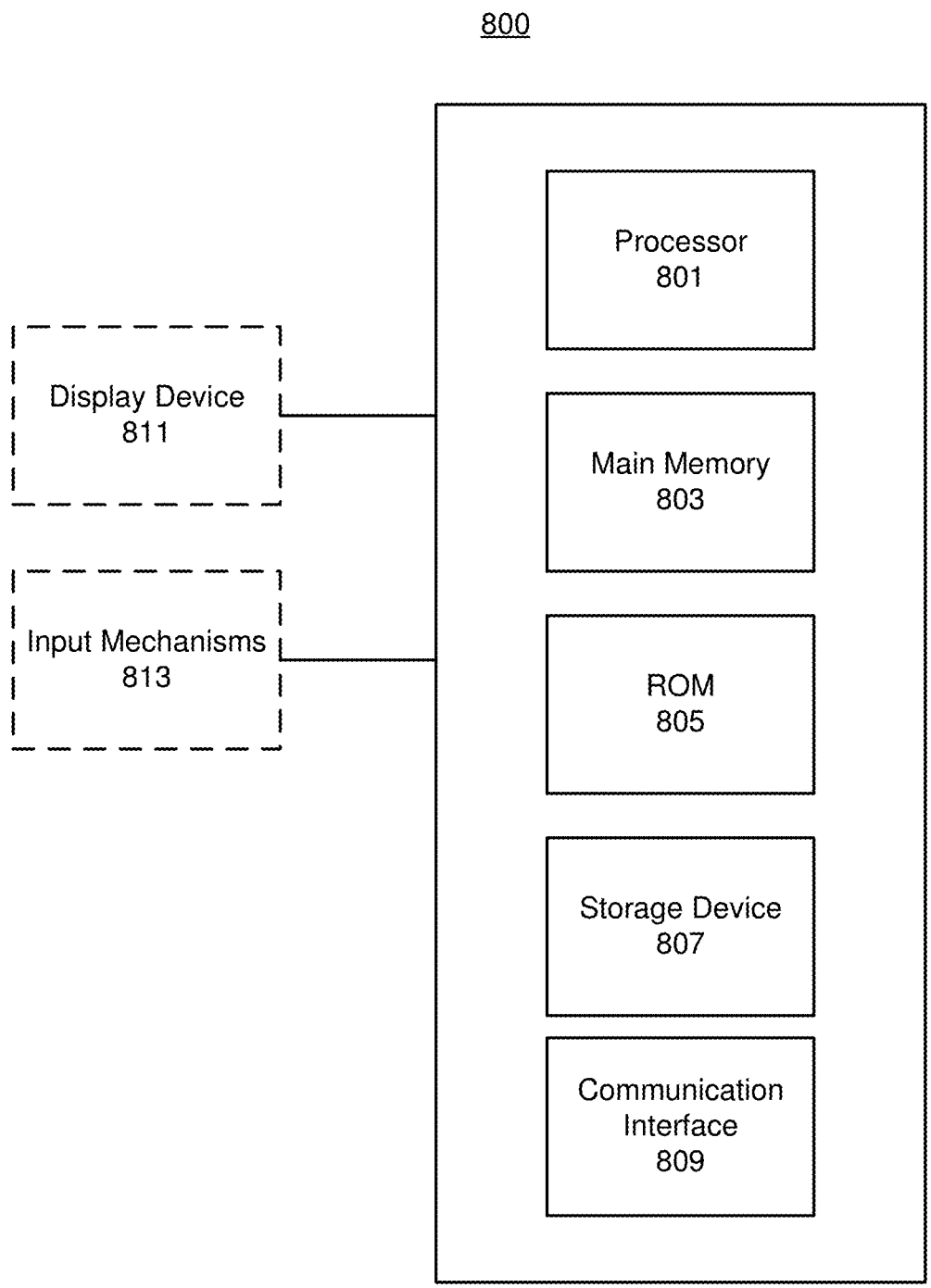
FIG. 8 is system diagram of a computer system, according to one embodiment.

FIG. 8 is a diagram illustrating a computer system 800 upon which embodiments described herein may be implemented within the vehicle 100. For example, in the context of FIG. 1, the lane detection system 105 may be implemented using a computer system such as described by FIG. 8. The lane detection system 105 may also be implemented using a combination of multiple computer systems as described by FIG. 8.

In one implementation, the lane detection system 105 includes processing resources 801, main memory 803, read only memory (ROM) 805, storage device 807, and a communication interface 809. The lane detection system 105 includes at least one processor 801 for processing information and a main memory 803, such as a random access memory (RAM) or other dynamic storage device, for storing information and instructions to be executed by the processor 801. Main memory 803 also may be used for storing temporary variables or other intermediate information during execution of instructions to be executed by processor 801. Lane detection system 105 may also include ROM 805 or other static storage device for storing static information and instructions for processor 801. The storage device 807, such as a magnetic disk or optical disk or solid state memory device, is provided for storing information and instructions.

The communication interface 809 can enable the lane detection system 105 to communicate with the vehicle control system 101 through use of a communication link (wireless or wireline). Using the communication link, the lane detection system 105 can communicate with the different subsystems included in the vehicle control system 101 to enable autonomous operation of the vehicle 100. In some variations, the lane detection system 105 can be configured to receive sensor data (e.g., such as GPS data) from one or more location tracking devices in the computer system 800. The sensor data can be processed by the processor 801 and can be stored in, for example, the storage device 807. The processor 801 can process the sensor data of a location tracking device in order to determine the location and trajectory of the vehicle 100.

The lane detection system 105 can optionally include a display device 811, such as a cathode ray tube (CRT), an LCD monitor, an LED monitor, a TFT display or a television set, for example, for displaying graphics and information to a user. An input mechanism 813, such as a keyboard that includes alphanumeric keys and other keys, can optionally be coupled to the computer system 800 for communicating information and command selections to processor 801. Other non-limiting, illustrative examples of input mechanisms 813 include a mouse, a trackball, touch-sensitive screen, or cursor direction keys for communicating direction information and command selections to processor 801 and for controlling cursor movement on display device 811.

Examples described herein are related to the use of the lane detection system 105 for implementing the techniques described herein. According to one embodiment, those techniques are performed by the lane detection system 105 in response to processor 801 executing one or more sequences of one or more instructions contained in main memory 803. Such instructions may be read into main memory 803 from another machine-readable medium, such as storage device 807. Execution of the sequences of instructions contained in main memory 803 causes processor 801 to perform the process steps described herein. In alternative implementations, hard-wired circuitry may be used in place of or in combination with software instructions to implement examples described herein. Thus, the examples described are not limited to any specific combination of hardware circuitry and software.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of training a lane detection system of an autonomous vehicle by generating training data for training the lane detection system, the method comprising:
   receiving a training image of a roadway indicative of a first position of a vehicle at a first time, the training image including a plurality of lane lines that designate a lane of the roadway, wherein at least a portion of the plurality of lane lines are occluded by objects on the roadway in the training image;
   identifying a plurality of images that include the plurality of lane lines of the roadway, the plurality of images representative of second positions of the vehicle on the roadway at second instances of time later than the first time;
   reconstructing the portion of the plurality of lane lines that are occluded in the training image based on the lane lines included in the plurality of images;
   generating training data for training the lane detection system based at least in part on the training image and the reconstructed portion of the plurality of lane lines in the training image; and
   training a lane detection system to predict lane lines of roadways in real-time images based at least in part on the generated training data.

2. The computer-implemented method of claim 1, wherein at least one image from the plurality of images was captured before the training image was captured, but the image is representative of a second position of the vehicle on the roadway at a second instance in time that is later than the first time.

3. The computer-implemented method of claim 1, further comprising:
   generating a reconstructed image of the roadway at the first time using the reconstructed portion of the plurality of lane lines, wherein the lane detection system is trained using the reconstructed image.

4. The computer-implemented method of claim 1, further comprising:
   receiving a plurality of first training images of different roadways, each of the plurality of first training images having at least a portion of lane lines being occluded by an object on a roadway included in the training image;
   identifying for each of the plurality of first training images a set of a plurality of images that includes the lane lines of the roadway included in the training image;
   reconstructing the occluded portion of the lane lines included in each of the plurality of first training images based on the lane lines of the roadway included in the identified set of plurality of images that corresponds to the training image; and
   generating reconstructed images of the plurality of first training images, each reconstructed image generated based on the reconstruction of the occluded portion of the lane lines included in the first training image corresponding to the reconstructed image.

5. The computer-implemented method of claim 4, wherein the lane detection system is a machine learned neural network model and wherein training the lane detection system comprises:
   training the machine learned neural network model using the generated reconstructed images.

6. The computer-implemented method of claim 5, further comprising:
   applying the trained lane detection system to the plurality of first training images, the trained lane detection system outputting predictions of lane lines of the roadways included in the plurality of first training images;
   determining an accuracy of the predictions of the trained lane detection system; and
   re-training the trained lane detection system responsive to the accuracy being below a threshold.

7. The computer-implemented method of claim 6, wherein re-training the trained lane detection system comprises:
   re-training the trained late detection system using plurality of second training images that are different from the plurality of first training images.

8. The computer-implemented method of claim 1, wherein at least a portion of the plurality of lane lines in the training image are not visible at a horizon of the training image.

9. The computer-implemented method of claim 8, further comprising:
   reconstructing the portion of the plurality of lane lines at the horizon of the training image based on the lane lines included in the plurality of images.

10. The computer-implemented method of claim 9, wherein reconstructing the portion of the plurality of lane lines comprises:
    generating an aerial view image of the training image;
    generating an aerial view image for each of the plurality of images; and
    combining the aerial view image of the training image and the aerial view image for each of the plurality of images into a combined image, the combined image including the plurality of lane lines from both the training image and the plurality of images and the objects on the roadway in the training image.

11. The computer-implemented method of claim 10, wherein each aerial view image included in the combined image is angled with respect to at least one other aerial view image included in the combined image, wherein a degree of angle of each aerial view image is based at least in part on a trajectory of the vehicle in the aerial view image.

12. The computer-implemented method of claim 11, wherein reconstructing the portion of the plurality of lane lines comprises:
    applying a curve fitting algorithm to the combined image to reconstruct the portion of the plurality of lane lines in the training image.

13. A lane detection system of an autonomous vehicle that generates training data for training the lane detection system, the lane detection system comprising:
    at least one computer processor; and
    a non-transitory computer-readable storage medium storing executable code, the code when executed by the computer processor causes the computer processor to perform steps comprising:
       receiving a training image of a roadway indicative of a first position of a vehicle at a first time, the training image including a plurality of lane lines that designate a lane of the roadway, wherein at least a portion of the plurality of lane lines are occluded by objects on the roadway in the training image;
       identifying a plurality of images that include the plurality of lane lines of the roadway, the plurality of images representative of second positions of the vehicle on the roadway at second instances of time later than the first time;

reconstructing the portion of the plurality of lane lines that are occluded in the training image based on the lane lines included in the plurality of images;

generating training data for training the lane detection system based at least in part on the training image and the reconstructed portion of the plurality of lane lines in the training image; and training a lane detection system to predict lane lines of roadways in real-time images based at least in part on the generated training data.

14. The lane detection system of claim 13, wherein at least one image from the plurality of images was captured before the training image was captured, but the image is representative of a second position of the vehicle on the roadway at a second instance in time that is later than the first time.

15. The lane detection system of claim 13, wherein the code when executed by the computer processor further causes the computer processor to perform steps comprising:

generating a reconstructed image of the roadway at the first time using the reconstructed portion of the plurality of lane lines, wherein the lane detection system is trained using the reconstructed image.

16. The lane detection system of claim 13, wherein the code when executed by the computer processor further causes the computer processor to perform steps comprising:

receiving a plurality of first training images of different roadways, each of the plurality of first training images having at least a portion of lane lines being occluded by an object on a roadway included in the training image;

identifying for each of the plurality of first training images a set of a plurality of images that includes the lane lines of the roadway included in the training image;

reconstructing the occluded portion of the lane lines included in each of the plurality of first training images based on the lane lines of the roadway included in the identified set of plurality of images that corresponds to the training image;

generating reconstructed images of the plurality of first training images, each reconstructed image generated based on the reconstruction of the occluded portion of the lane lines included in the first training image corresponding to the reconstructed image; and training the lane detection system using the generated reconstructed images, wherein the lane detection system is a machine learned neural network model.

17. A non-transitory computer-readable storage medium storing executable code for training a lane detection system of an autonomous vehicle by generating training data for training the lane detection system, the code when executed by at least one computer processor causes the computer processor to perform steps comprising:

receiving a training image of a roadway indicative of a first position of a vehicle at a first time, the training image including a plurality of lane lines that designate a lane of the roadway, wherein at least a portion of the plurality of lane lines are occluded by objects on the roadway in the training image;

identifying a plurality of images that include the plurality of lane lines of the roadway, the plurality of images representative of second positions of the vehicle on the roadway at second instances of time later than the first time;

reconstructing the portion of the plurality of lane lines that are occluded in the training image based on the lane lines included in the plurality of images;

generating training data for training the lane detection system based at least in part on the training image and the reconstructed portion of the plurality of lane lines in the training image; and training a lane detection system to predict lane lines of roadways in real-time images based at least in part on the generated training data.

18. The non-transitory computer-readable storage medium of claim 17, wherein at least one image from the plurality of images was captured before the training image was captured, but the image is representative of a second position of the vehicle on the roadway at a second instance in time that is later than the first time.

19. The non-transitory computer-readable storage medium of claim 17, wherein the code when executed by the computer processor further causes the computer processor to perform steps comprising:

generating a reconstructed image of the roadway at the first time using the reconstructed portion of the plurality of lane lines, wherein the lane detection system is trained using the reconstructed image.

20. The non-transitory computer-readable storage medium of claim 17, wherein the code when executed by the computer processor further causes the computer processor to perform steps comprising:

receiving a plurality of first training images of different roadways, each of the plurality of first training images having at least a portion of lane lines being occluded by an object on a roadway included in the training image;

identifying for each of the plurality of first training images a set of a plurality of images that includes the lane lines of the roadway included in the training image;

reconstructing the occluded portion of the lane lines included in each of the plurality of first training images based on the lane lines of the roadway included in the identified set of plurality of images that corresponds to the training image;

generating reconstructed images of the plurality of first training images, each reconstructed image generated based on the reconstruction of the occluded portion of the lane lines included in the first training image corresponding to the reconstructed image; and training the lane detection system using the generated reconstructed images, wherein the lane detection system is a machine learned neural network model.

* * * * *